UNITED STATES PATENT OFFICE.

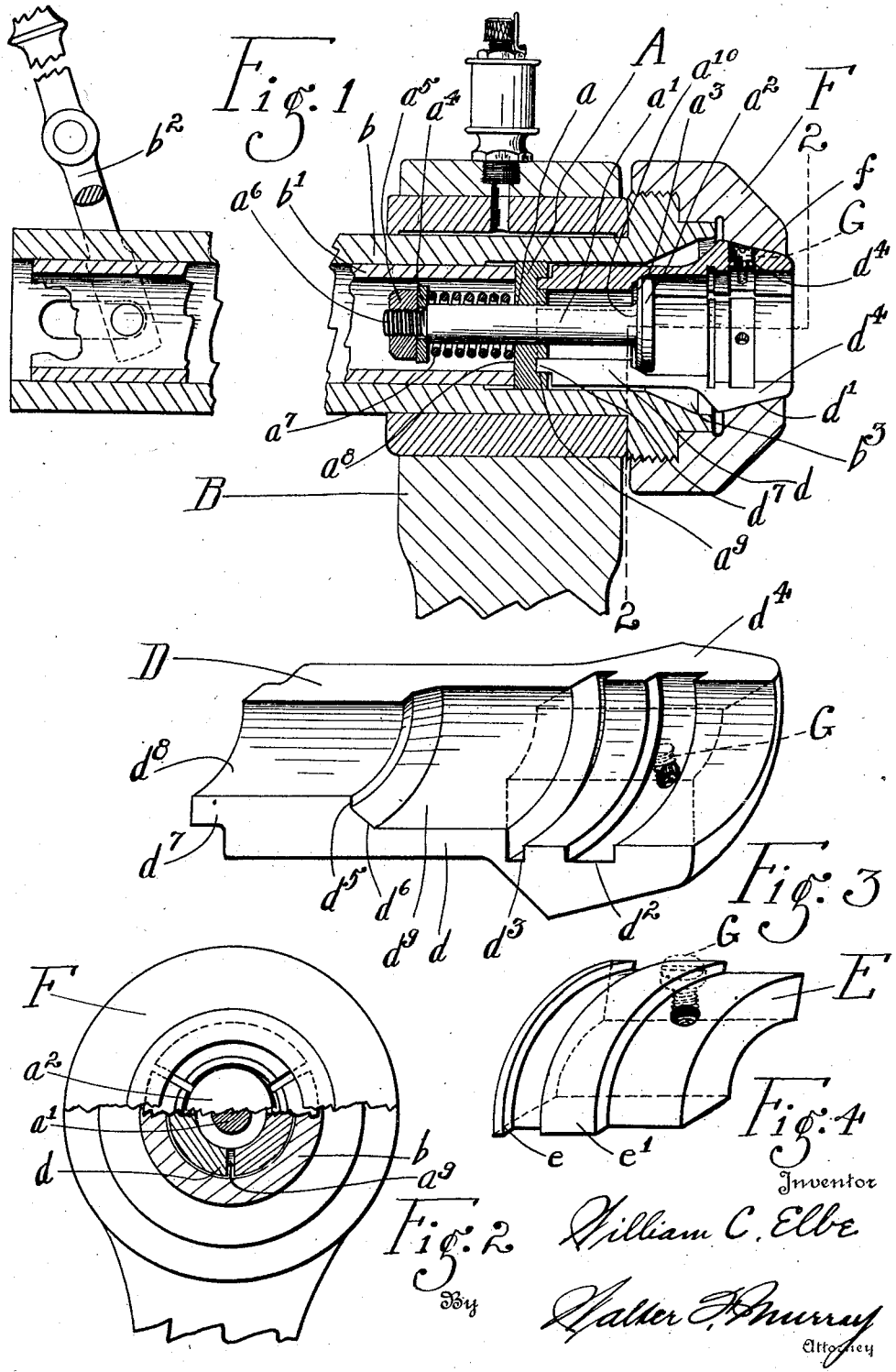

WILLIAM C. ELBE, OF CINCINNATI, OHIO.

MASTER COLLET.

1,408,182.   Specification of Letters Patent.   Patented Feb. 28, 1922.

Application filed December 15, 1920. Serial No. 430,903.

*To all whom it may concern:*

Be it known that I, WILLIAM C. ELBE, a citizen of the United States of America, and resident of Cincinnati, in the county of Hamilton and State of Ohio, have invented a new and useful Improvement in a Master Collet, of which the following is a specification.

An object of my invention is to provide a master collet that is not subject to crystallization whereby the jaws will break from the body of the collet.

Another object is to provide an improved collet of the type referred to that is adapted to support auxiliary jaws whereby work of different sizes may be secured between the auxiliary jaws.

Another object is to provide a collet in which the grip of the jaws is not controlled by any spring tensioning within the jaws themselves.

These and other objects are attained by the means described herein and disclosed in the accompanying drawing in which:—

Fig. 1 is a longitudinal sectional view of a part of a lathe head spindle having a collet embodying my invention mounted therein.

Fig. 2 is a sectional view on line 2—2 of Fig. 1.

Fig. 3 is an enlarged perspective view of one of the jaws of a master collet showing in dotted lines a temporary jaw mounted thereon, all which form details of my invention.

Fig. 4 is a perspective view of a temporary jaw adapted to be mounted upon one of the jaws of the master collet.

My invention comprises a collar $A$ adapted to be reciprocally mounted within the spindle $b$ of a machine tool such as a lathe $B$. A slidable sleeve $b'$ or any other suitable actuating means may be contained within the spindle $b$ of the lathe and is adapted to be moved into engagement with the collar $A$ by means of the lever $b^2$ mounted upon the lathe. The reciprocation of master collets in the spindles by means of such levers and sleeve is common and well known in the art and requires no further explanation. The collar $A$ has a central perforation $a$ through which a reciprocating plunger $a'$ extends. A head $a^2$ is formed on the forward end of the plunger $a'$ and has formed on its rear outer edge a forwardly diverging face $a^3$. A washer $a^4$ is secured upon the rear end of the plunger $a'$ by means of a nut $a^5$ mounted on the threaded end $a^6$ of the plunger. A spiral spring $a^7$ is interposed between the washer $a^4$ and the rear surface $a^8$ of the collar $A$. In the forward surface of the collar $A$ are formed a series of notches $a^9$ adapted to pivotally seat the master collet jaws or expansion jaws $D$.

The jaws $D$ have a shank $d$ adapted to extend partly within the spindle $b$ and to extend forwardly beyond the mouth $b^3$ of the spindle. A head $d^4$ is formed on the forward end of the shank. An external tapered face $d'$ is formed on the head $d^4$ of the jaw, such face diverging rearwardly. A series of grooves $d^2$ and $d^3$ are formed interiorly of the head $d^4$ of the jaw, and are adapted to accommodate a series of lugs $e$ and $e'$ formed on the temporary jaw $E$ that may be mounted within the jaws $D$. A primary internal surface $d^8$ and secondary internal surface $d^9$ are formed on the inner wall of the jaws between which is formed an abutment $d^5$ and an internal tapered face $d^6$, such internal face diverging forwardly. Lugs $d^7$ are formed on the rear ends of the jaw shanks $d$, such lugs being adapted to engage in the slots $a^9$ in the collar $A$. A locking ring $F$ is adapted to be mounted upon the forward end of the spindle $b$ and has a central bore in alignment with the jaws $D$. The face $f$ of the bore is tapered and diverges rearwardly. The bore in the ring $F$ is at its smallest diameter, of a diameter less than the greatest diameter of the external faces $d'$ formed on the jaws $D$ regardless whether or not the jaws are in a normal position, wherefore the heads $d^4$ of the jaws $D$ will be moved toward one another when brought into contact with or moved against such tapered face formed within the ring $F$. The tapered face $a^3$ on the plunger is adapted to engage the internal tapered faces $d^6$ formed on the jaws, whereby the jaws will expand when the plunger head is moved rearwardly in relation to the jaws $D$, and wherefore the plunger head will be moved forwardly when the heads of the jaws are moved upon one another, when the external faces on the heads $d^4$ of the jaws are moved against the face of the bore in the ring $F$.

The operation of my device is as follows:

The collet is inserted within the spindle $b$. The locking ring is then mounted upon the spindle. The collet assumes a normal or open position when the sleeve $b'$ does not hold the collet in its foremost position or when the sleeve $b'$ does not engage the collar A. In the open or normal position of the collet, the spring $a^7$ pushes the plunger $a'$ rearwardly because of the abutment of the spring upon the rear wall $a^3$ of the collar and upon the washer $a^4$ of the plunger. When the sleeve $b'$ is moved rearwardly, the collet is free to move rearwardly within the spindle $b$, therefore the spring causes the collet to move rearward. This is accomplished as follows:—

The head $a^2$ of the plunger tends to move rearwardly, the tapered face on the plunger engaging the internal faces on the jaws, so the rear surface $a^{10}$ of the head of the plunger will engage the abutment surface $d^5$ of the jaw. This tendency of the plunger causes the heads of the jaws to expand, and they simultaneously expand and move the collet rearwardly because the sleeve $b'$ no longer holds the collet in its forward position. In other words, the tension on the spring is transmitted to the heads of the jaws and because of the tapered contacting surfaces, the collet moves backward. The shanks $d$ of the jaws being restrained against movement because of their engagement with the collar A, the heads of the jaws must therefore move apart, and the entire collet is moved backward and assumes a normal position within the spindle $b$ and the ring F. Work may be held between the jaws D or the temporary jaws E may be secured upon the jaws D according to the size and nature of the work. The work is inserted between the jaws and the sleeve $b'$ is moved forwardly by means of the lever $b^2$. When the sleeve $b'$ engages the collar A, the collar A is moved forwardly. The jaws D are moved upon one another because of their contact upon the tapered bore of the ring F. At the same time the head $a^2$ formed on the plunger is moved forwardly because of its engagement upon the internal face $d^6$ formed on the jaws and because the jaws are being moved toward one another, the spring $a^7$ is compressed. The lever $b^2$ is moved forward until the work is tightly secured between the jaws. When the sleeve $b'$ is moved backward the spring $a^7$ tending to assume an untensioned position reverses the movements of the plunger $a^2$ and the jaw heads $d^4$, wherefore the jaws are separated. The temporary jaws may be mounted upon the jaws D by any suitable means such as the screws G.

What I claim is:

The combination of a hollow spindle, a locking ring mounted on the spindle and having a tapered bore in alignment with the axis of the spindle, a collet mounted reciprocally in the spindle and comprising a collar, expansible jaws mounted pivotally upon the collar, and having a primary internal surface and a secondary internal surface, a plunger mounted reciprocally in the collar, a head on the plunger, a tapered face on the plunger head engaging the jaws intermediate the primary and secondary internal surfaces, yieldable means to maintain the tapered face on the plunger head in engagement with the jaws and means to move the jaws over the face of the bore in the spindle.

In testimony whereof, I have hereunto subscribed my name this 11th day of December, 1920.

WILLIAM C. ELBE.